(12) United States Patent
Stevenson

(10) Patent No.: US 9,233,786 B2
(45) Date of Patent: Jan. 12, 2016

(54) METHOD OF FABRICATING A CAPSULE BELT

(75) Inventor: Robert Andrew Stevenson, Jandakot (AU)

(73) Assignee: RAINDANCE SYSTEMS PTY LTD, Jandakot (AU)

( * ) Notice: Subject to any disclaimer, the term of this patent is extended or adjusted under 35 U.S.C. 154(b) by 417 days.

(21) Appl. No.: 13/818,540

(22) PCT Filed: Aug. 24, 2011

(86) PCT No.: PCT/AU2011/001092
§ 371 (c)(1),
(2), (4) Date: Apr. 29, 2013

(87) PCT Pub. No.: WO2012/024732
PCT Pub. Date: Mar. 1, 2012

(65) Prior Publication Data
US 2013/0206913 A1 Aug. 15, 2013

(30) Foreign Application Priority Data
Aug. 24, 2010 (AU) ................... 2010903796

(51) Int. Cl.
*B65D 75/34* (2006.01)
*A62C 3/02* (2006.01)
(Continued)

(52) U.S. Cl.
CPC ............... *B65D 75/34* (2013.01); *A01C 1/042* (2013.01); *A01C 21/00* (2013.01); *A01M 25/00* (2013.01); *A61J 1/035* (2013.01); *A62C 3/02* (2013.01); *B65B 9/042* (2013.01); *B65B 9/045* (2013.01); *B65B 11/50* (2013.01); *B65B 11/52* (2013.01); *B65B 61/00* (2013.01); *B65B 61/06* (2013.01); *F42B 12/44* (2013.01); *F42B 33/00* (2013.01); *F42B 33/02* (2013.01)

(58) Field of Classification Search
CPC ........ B65D 75/34; B65D 75/32; B65D 75/30; B65D 75/28; B65D 75/00; A62C 3/02; A62C 3/00; B65B 11/50; B65B 11/00; B65B 11/52; B65B 61/00; B65B 61/06; B65B 61/04; B65B 9/042; B65B 9/04; B65B 9/02; B65B 9/00; B65B 9/045; A61J 1/035; A61J 1/03; A61J 1/00; F42B 33/00; F42B 12/44; F42B 12/36; F42B 12/02; F42B 12/00; F42B 23/02; A01C 21/00; A01C 1/042; A01C 1/04; A01C 1/00; A01M 25/00
See application file for complete search history.

(56) References Cited

U.S. PATENT DOCUMENTS

| 4,861,586 | A | 8/1989 | Schneider et al. |
| 6,516,565 | B1 | 2/2003 | Fima |

(Continued)

FOREIGN PATENT DOCUMENTS

| CN | 101091436 | 12/2007 |
| WO | WO 2009/109023 | 9/2009 |

(Continued)

OTHER PUBLICATIONS

Jan. 3, 2012, International Search Report PCT/AU2011/001092.

*Primary Examiner* — Christopher J Novosad
(74) *Attorney, Agent, or Firm* — Neifeld IP Law, PC

(57) ABSTRACT

A method of fabricating a belt of capsules comprising: providing a first strip of material, forming a matrix of receptacles in the first strip, depositing a quantity of at least one material in each receptacle, attaching a second strip of material over the first strip to close the receptacles and form a matrix of capsules, and cutting the matrix of capsules into rows to thereby form a plurality of belts of capsules.

20 Claims, 5 Drawing Sheets

Figure 1:
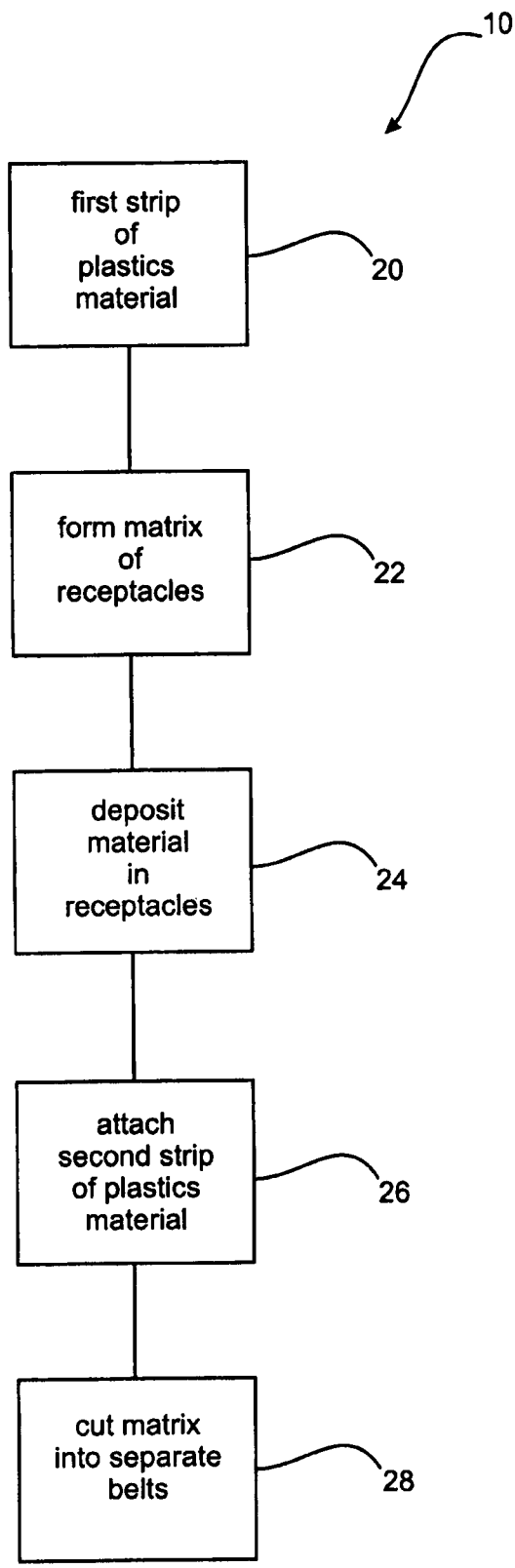

(51) Int. Cl.
*B65B 9/04* (2006.01)
*B65B 11/52* (2006.01)
*B65B 61/06* (2006.01)
*A61J 1/03* (2006.01)
*F42B 12/44* (2006.01)
*F42B 33/00* (2006.01)
*A01C 1/04* (2006.01)
*A01C 21/00* (2006.01)
*A01M 25/00* (2006.01)
*B65B 61/00* (2006.01)
*F42B 33/02* (2006.01)
*B65B 11/50* (2006.01)

(56) References Cited

U.S. PATENT DOCUMENTS

| | | | |
|---|---|---|---|
| 6,877,433 | B1 | 4/2005 | Stevenson |
| 6,941,729 | B2 | 9/2005 | Dal Pozzo |
| 7,089,862 | B1 | 8/2006 | Vasquez |
| 7,283,156 | B1 | 10/2007 | Morgan |
| 7,451,679 | B2 | 11/2008 | Stevenson et al. |
| 2005/0097810 | A1 | 5/2005 | Staples |
| 2007/0186511 | A1 | 8/2007 | Hultberg et al. |
| 2008/0105587 | A1 | 5/2008 | Hawes et al. |
| 2010/0094084 | A1 | 4/2010 | Chuang |

FOREIGN PATENT DOCUMENTS

| | | |
|---|---|---|
| WO | WO 2011/106835 | 9/2011 |
| WO | WO 2012/024732 A1 | 3/2012 |

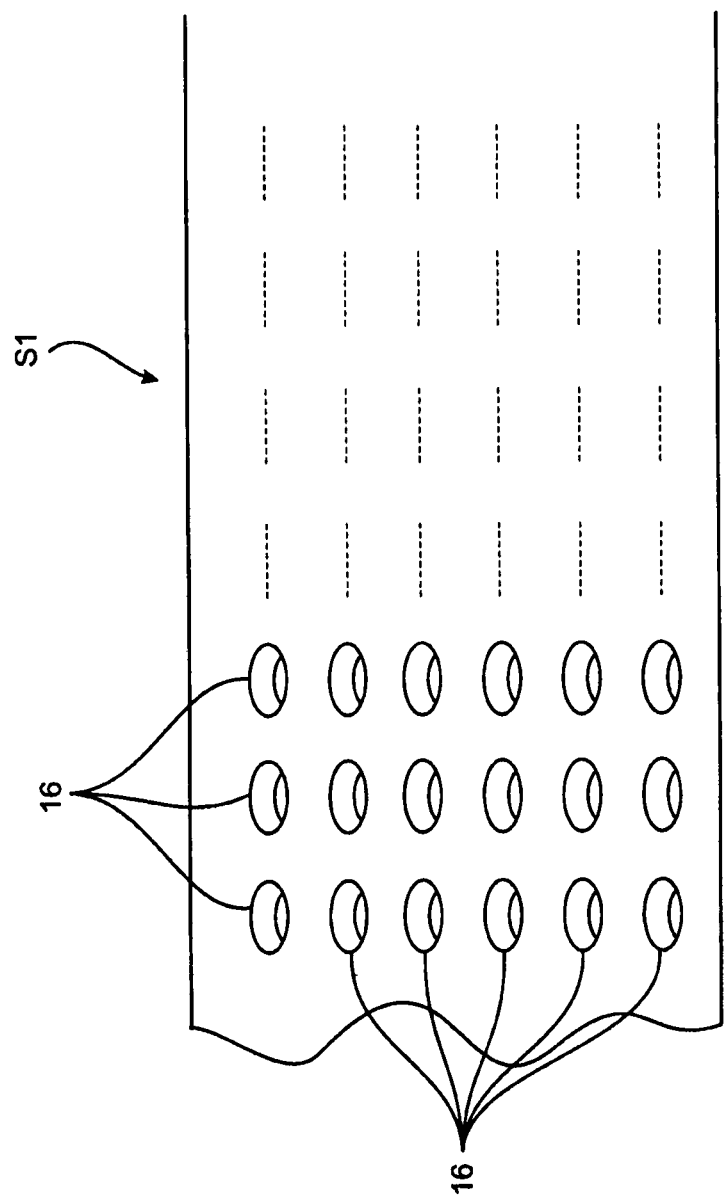

METHOD OF FABRICATING A CAPSULE BELT

CROSS REFERENCE TO RELATED APPLICATIONS

This application is a national stage entry of PCT/AU2011/001092, filed Aug. 24, 2011, which published as WO 2012/024732 on Mar. 1, 2012, which claims priority to Australia Application No. 2010903796, filed Aug. 24, 2010.

FIELD OF THE INVENTION

The present invention relates to a method of fabricating a capsule belt particularly, although no exclusively, for aerial dispensing.

The invention also relates to methods of using such capsule belts for specific purposes.

BACKGROUND OF THE INVENTION

It is known to drop incendiaries from aircraft such as helicopters and light fixed wing aircraft for the purposes of forestry management. One known incendiary is in the form of a small sphere having a diameter of approximately 32 mm made from plastics material filled with a quantity of potassium permanganate. The sphere is injection moulded from extruded plastic. The sphere is made initially as two hemispheres one of each is filled with the potassium permanganate. The other half of the sphere is subsequently attached to the first hemisphere. The spheres are subsequently placed in a hopper which feeds them sequentially to a chute where they are injected with a small volume of glycol. This initiates as exothermic reaction generating a flame.

The present inventor developed an alternate form of incendiary described in U.S. Pat. No. 6,877,433 in which the incendiary comprises a plurality of containers coupled together to form a belt which is fed through a dispensing machine. The present invention was motivated by a desire to provide an alternate method of manufacturing the incendiary capsules. However during the course of developing the alternate method it became apparent that the method is generic to the extent that it can be applied to the manufacture of capsule belts per se irrespective of the contents of the capsules which can be varied for the application at hand.

SUMMARY OF THE INVENTION

One aspect of the present invention provides a method of fabricating a belt of capsules comprising:
providing a first strip of material;
forming a matrix of receptacles in the first strip;
depositing a quantity of at least one material in each receptacle;
attaching a second strip of material over the first strip to close the receptacles and form a matrix of capsules;
cutting the matrix of capsules into rows to thereby form a plurality of belts of capsules.

In one embodiment forming the matrix of receptacles comprises vacuum forming the receptacles in the first strip of plastics material.

In one embodiment attaching the second strip of plastics material comprises providing the second strip as a roll of plastics material of the same type as the plastics material of the first strip and unwinding the roll to overlay the second strip over the first strip.

In one embodiment the method comprises forming the second strip with a thickness of between 20%-60% of the thickness of the first strip.

In one embodiment the first strip has a thickness in the order of between 200 μm to 1000 μm.

In one embodiment the second strip has a thickness in the order of between 200 μm to 400 μm.

In one embodiment the method comprises providing the material as a plastics material.

In one embodiment the method comprises providing the plastics material as a bioplastic material.

In one embodiment attaching the second strip over the first strip comprises applying a layer of adhesive material to one side of either one or both of the first strip and second strip and contacting the one sides of the first strip and second strip together.

In one embodiment attaching the second strip over the first strip comprises ultrasonically welding the first and second strips together.

In one embodiment the method comprises winding the plurality of belts simultaneously onto respective rolls.

In one embodiment depositing a quantity of at least one material comprises developing a quantity of an incendiary material.

The method may comprise depositing a quantity of thermite in each receptacle prior to attaching the second strip. In one embodiment the method according to comprises, prior to depositing the thermite in the receptacles, applying a liquid impervious coat or cover to the thermite.

In one embodiment depositing a quantity of at least one material comprises depositing at least one plant seed. In this embodiment the method may further comprise depositing a seed growing medium in each receptacle prior to attaching the second strip.

In one embodiment depositing a quantity of at least one material comprises depositing a sensor having a power source and transmitter.

In one embodiment depositing a quantity of at least one material comprises depositing animal bait.

A second aspect of the invention provides a capsule belt comprising a series of end to end joined capsules, each capsule being made of a bioplastic material.

A third aspect of the invention provides a capsule belt according to the second aspect when made in accordance with the method of the first aspect.

In one embodiment each capsule in the belt contains a plant seed.

In one embodiment each capsule further comprises a growing medium for the plant seed.

A fourth aspect of the invention provides a method of vegetating a tract of land comprising providing a capsule belt according to the third aspect where each capsule contains a plant seed, injecting a quantity of one or both of a plant nutrient and water into a capsule in the belt, separating the injected capsule form the belt and dropping the injected capsule to the tract of land.

A fifth aspect of the invention provides a method of baiting an animal comprising:
fabricating a belt of capsules in accordance the first aspect and wherein the depositing comprises depositing animal bait;
injecting a quantity of a poison into a capsule in the belt, separating the injected capsule form the belt and dropping the injected capsule to the tract of land.

In one embodiment dropping the injected capsule comprises dropping the injected capsule from an airborne aircraft.

In one embodiment the injecting, separating are performed in an airborne aircraft, and the dropping is performed from the aircraft while airborne.

A sixth aspect of the invention provides a method of remote sensing comprising fabricating a belt of capsules in accordance with the first aspect and wherein the depositing comprises depositing a sensor having a power source and transmitter; separating the capsules from the belt and dropping the separated capsules form a moving vehicle.

In one embodiment dropping the separated capsules comprises dropping the capsules from an airborne aircraft.

In one embodiment the separating is performed in an airborne aircraft, and the dropping is performed from the aircraft while airborne A seventh aspect of the invention provides capsule made of a biodegradable plastics material and containing at least one plant seed.

In one embodiment the capsule further contains a growing medium for the seed.

An eight aspect of the invention provides a capsule made of a biodegradable plastics material and containing a sensor having a power source and transmitter.

BRIEF DESCRIPTION OF THE DRAWINGS

Embodiments of the present invention will now be described by way of example only in which:

FIG. 1 is a flow diagram showing steps in one embodiment of a method of fabricating a capsule belt in accordance with the present invention;

FIG. 2 is a side view of a machine operable to perform the method shown in FIG. 1;

FIG. 3 is a plan view of the machine shown in FIG. 2;

FIG. 4 is an isometric view of the machine shown in FIGS. 2 and 3;

FIG. 5 is a side view of a portion of a capsule belt made using the method of FIG. 1 and machine of FIGS. 2 to 4;

FIG. 6 is a plan view of the portion of the belt shown in FIG. 5; and,

FIG. 7 is a schematic representation of a first strip of plastic material during a step in the method shown in FIG. 1.

DETAILED DESCRIPTION OF PREFERRED EMBODIMENTS

Embodiments of the present invention provide a method for manufacturing a capsule belt, and more particularly a method of simultaneously forming a plurality of capsule belts. In broad terms, the method involves providing a base or first sheet of a material and forming a matrix of receptacles in the base sheet. This base sheet is then forwarded to a filling station where material is deposited into the receptacles. A second strip of material is sealed over the first sheet to effectively close each of the separate receptacles. At this stage of the process, there is now a matrix of closed capsules. This matrix of closed capsules is then cut into separate rows, each row forming a respective capsule belt. Conveniently, the belts are wound simultaneously onto separate rolls or drums which can be individually removed from a common shaft to provide in effect respective capsule belt magazines. In one application, the magazines may be loaded onto an aircraft carrying an associated dispensing machine such as that described in U.S. Pat. No. 7,451,679 or AU 2010900875 (the contents of both of which is incorporated herein by way of reference) which injects a second substance into each capsule then separates the capsules from the belt allowing them to fall to the ground.

In a fire control and back burning operation, the material deposited into each receptacle at the time of manufacture may be one part of a two component exothermic mixture. For example the material loaded during the manufacture of the capsule belt may be potassium permanganate. When the capsule belt is in use, glycol is injected into each capsule and substantially simultaneously the injected capsule is severed from the belt and dispensed from an aircraft. The potassium permanganate and glycol exothermically react creating a flame to ignite vegetation for the purposes of back burning.

However the material deposited in the receptacle at the time of manufacture of a capsule belt is not limited to an incendiary material, and is only dependant on the desired application of the capsules in the belt. For example for the purposes of say revegetation of an area, at the time of manufacturing the belts, the material deposited into each receptacle may be a plant seed possibly together with a quantity of a growing medium for the seed. Subsequently a second material such as a liquid nutrient or simply just water may be injected into each capsule prior to or substantially simultaneous with severing the injected capsule from the belt and dispensing the capsule. This may be conducted in an airborne manner such as described above in relation to the dispensing of incendiaries, or from the back of a land vehicle traversing the ground.

In yet another example the receptacles may be loaded with one or more sensors and the corresponding capsules severed from a belt and dispensed. In this example no second material or substance is injected into the capsule before dispensing.

Embodiments of the method contemplate the manufacture of capsule belts from a plastics material. Throughout this specification and claims the term “plastics material” is intended to be interpreted broadly to encompass synthetic or fossil fuel derived plastics material and bioplastics material, unless from the specific context of the use of this term an alternate meaning is clearly intended. The term “bioplastic” is intended to be interpreted broadly to encompass forms of plastics which are able to biodegrade in time and there by minimise adverse environmental effects. Non limiting examples of synthetic or fossil fuel derived plastics material are: polyethylene terephthalate; high-density polyethylene; polyvinyl chloride; low-density polyethylene; and polypropylene. Non limiting examples of bioplastics are: starch based plastics, cellulose based plastics, bioplastic derived from microbiota; and polylatic acid (PLA) plastics.

FIG. 1 illustrates in a very general manner embodiment of a method 10 of fabricating a capsule belt 12 shown in FIGS. 5 and 6. Capsule belt comprises a plurality of end to end joined capsules 14. Each capsule has a receptacle 16 for holding a substance 18 and is closed by an upper layer of plastics material. An initial step 20 in the method 10 comprises providing a first sheet or strip (for ease of reference the term hereinafter the term “strip” is used to denote a strip or sheet) of material exemplified by a plastics material. As explained in greater detail later with reference to FIGS. 2-4, this strip may be provided as a roll wound onto a drum. Next step 22 in method 10 is the forming receptacles 16 in the first strip of plastics material. The receptacles 16 may be formed for example by a vacuum forming process. Once the receptacles have been formed, at step 24, material/substance 18 which is required to be held within the capsules 14 is deposited into the respective receptacles 16. The material deposited is dependent only on the intended application of the capsules after manufacture. For example, if the capsules are to be used as incendiary capsules, then the material 18 could be for example potassium permanganate.

However in an alternate example one or more plant seeds and optionally a growing medium such as sand can be deposited in each receptacle.

Once the material 18 has been deposited, at step 26 a second strip of material, also exemplified by a plastics material is attached over the first strip to close the receptacles. The second strip maybe provided as a roll of a thin plastic materials sheet wound about a drum.

With the second strip of plastics material now attached to first strip and closing the receptacles, there is now produced a matrix of sealed capsules. In order to form individual capsule belts 12, the matrix of capsules is cut into rows at step 28. The belts 12 may be wound onto individual drums or reels forming respective magazines which can be loaded into a dispensing machine for subsequent dispensing of individual capsules from the belt.

In one embodiment it is envisaged that the first and second strips of plastics material are made from the same type of plastics material although the second strip may have a thickness in the order of between 20%-60% the thickness of the first strip. In one example, the first strip may have a thickness in the order of between 200 μm to 1000 μm where the second strip has a thickness in the order of between 200 μm and 400 μm. The second strip may have a layer of adhesive material pre applied on one side to facilitated attachment to the first strip and sealing of the receptacles.

In an alternate embodiment however the first and second strips may be made from different materials. Further the second strip can comprise for example an adhesive strip, being a strip of material with an adhesive material on one side to facilitate attachment to the capsules.

Figure 2:
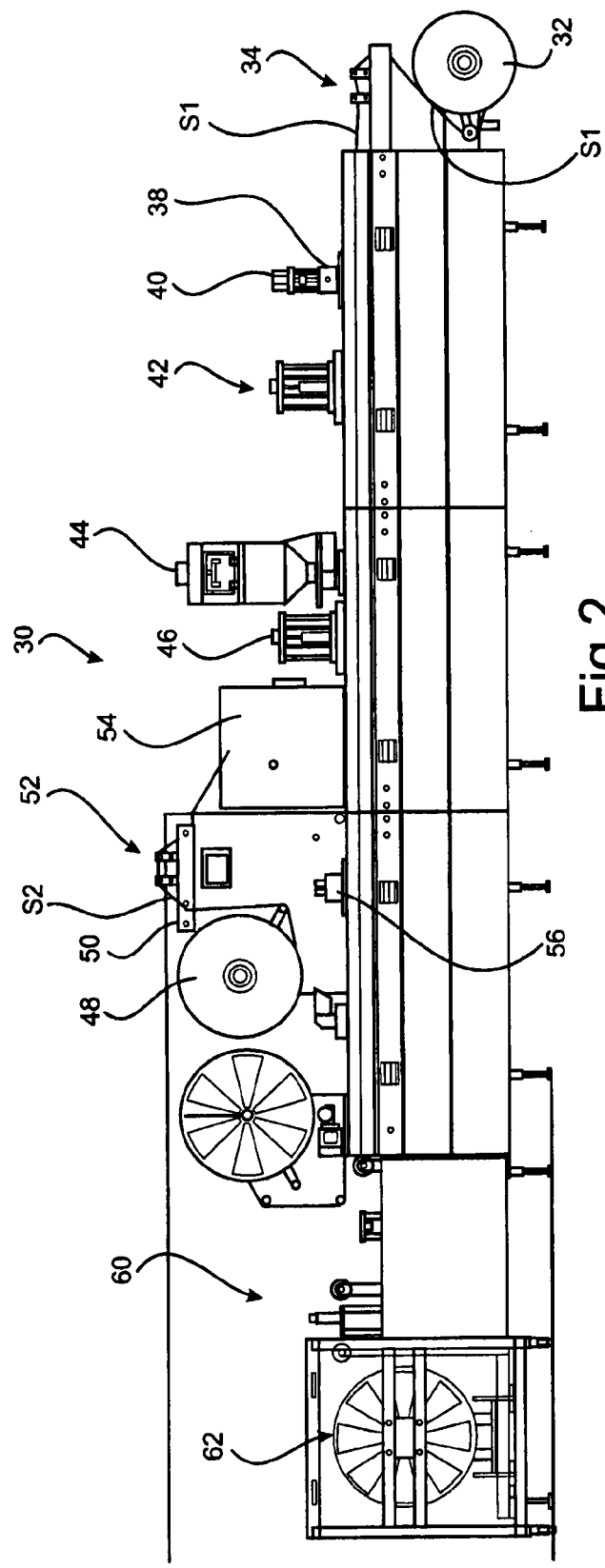
Figure 3:
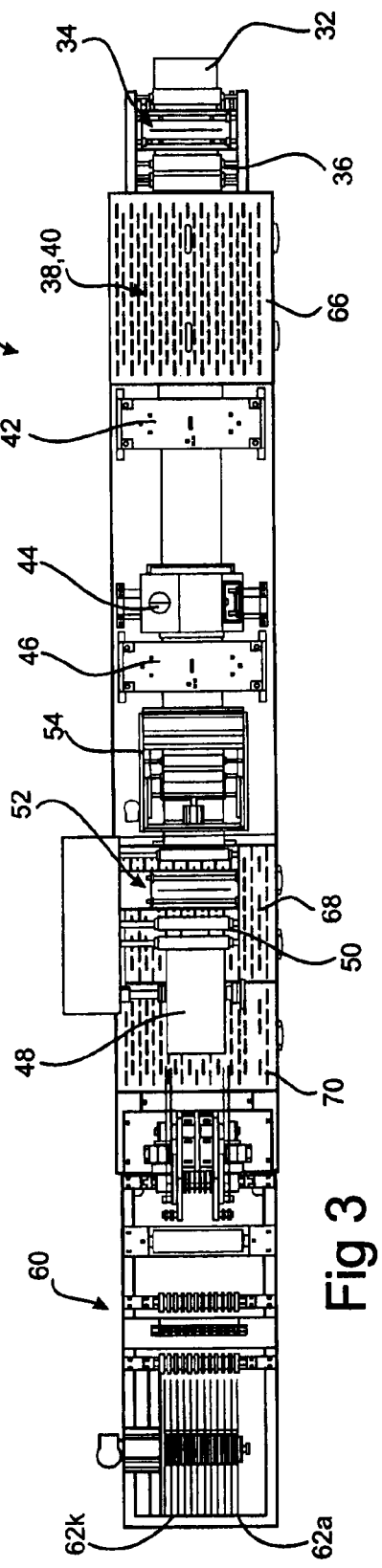
Figure 4:
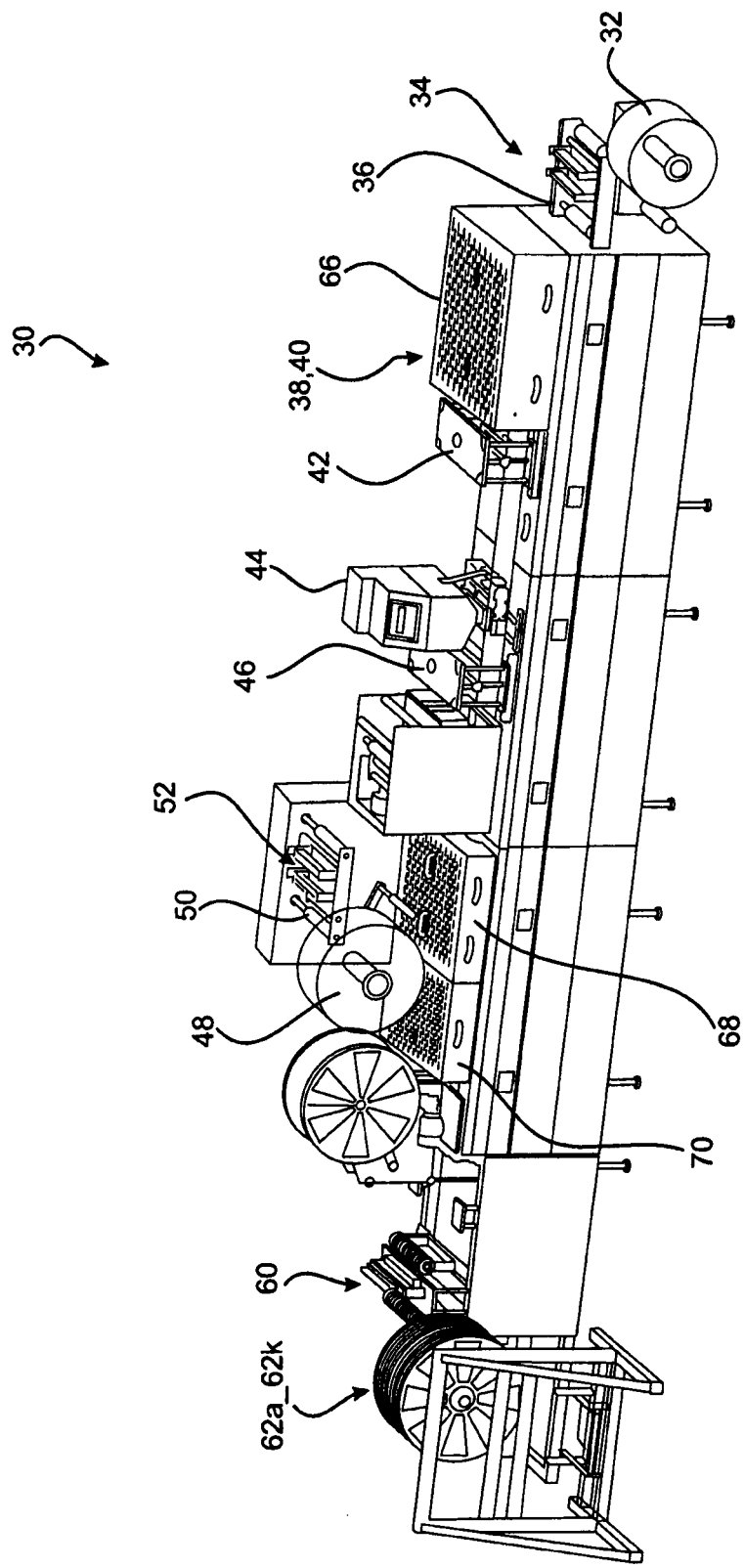
Figure 5:
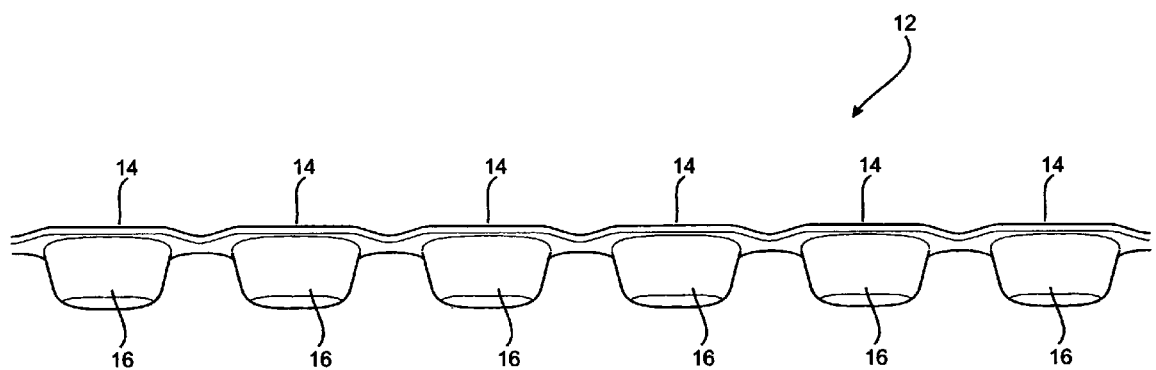
Figure 6:
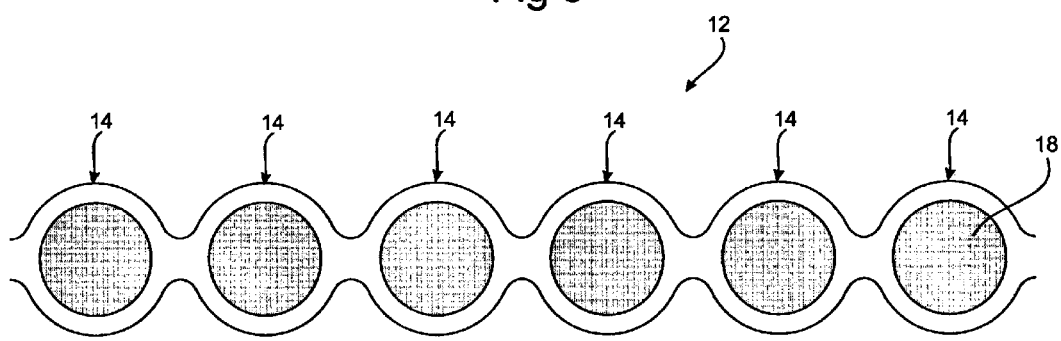

FIGS. 2-4, illustrate an embodiment of a machine 30 for performing method 10. The machine 30 has a drum 32 at one end on which is wound the first strip S1 of plastics material. Strip S1 is fed through a splice table 34 above, and adjacent drum 32. Splice table 34 trims the overall width of the first strip S1 of plastics material prior to feeding to the next stage of machine 30. In the present embodiment, machine 30 is set up to simultaneously produce eleven capsule belts 12 side by side. Thus the plastics material on drum 32 is formed of a width commensurate with the dimensioning of eleven capsules side by side. Splice table 34 is set to trim opposite sides of the first strip S1 to accord with this desired width. Rollers 36 adjacent splice table 34 assist in guiding the spliced first strip to a receptacle forming stage 38 of machine 30. The stage 38 in this embodiment comprises a vacuum forming system which forms receptacles 16 in the first strip of plastics material.

FIG. 7 is a schematic representation of a length of the first strip S1 of plastics material in which is formed a matrix of receptacles 16. In this illustration, the strip S1 is of a width so that there are six receptacles 16 formed across the width of strip S1. However as mentioned above, for the particular lay out of machine 30 shown in FIGS. 2-4, eleven receptacles 16 will be formed side by side. To assist in vacuum forming process of receptacles 16, machine 30 comprises a forming mechanism 40 having a matrix of protrusions each of configuration complimentary to that of an inside surface of the receptacles 16.

The forming mechanism is pushed into hollows formed in a vacuum forming plate beneath the strip S1 to assist in forming and shaping the receptacles. Thus, during the vacuum forming process, strip S1 is placed on top of a vacuum forming plate. Heat and vacuum is applied to conform the strip S1 to the hollows in the vacuum forming plate. To ensure correct formation of receptacles 16, the forming mechanism, is lowered toward the vacuum forming plate and into receptacles 16 so that strip S1 is acted upon on opposite sides by the vacuum forming plate and the plug.

Once the vacuum forming process has been completed, the strip S1 passes through checking station 42 which scans sheet S1 and receptacles 16 to ensure receptacles 16 are properly formed. Next, strip S1 is advanced to filling station 44 of machine 30 at which material 18 is deposited into receptacles 16. Filling station 44 is controlled to deposit the appropriate quantity of material 18 into each of the receptacles 16. As mentioned before, one of these materials may be potassium permanganate. In an alternate example, the material may comprise a plant seed and a quantity of growing medium such as soil. In yet a further alternatives the material may be a sensor, or a bait. After filling of receptacles 16, strip S1 is advanced through a further checking station 46. The station 46 may for example comprise an optical or ultrasonic scanner which scans each receptacle 16 to ensure each is filled with a required amount of material 18.

The next stage in the manufacture of the incendiary belt 12 is step 26 shown in FIG. 1 where a second strip S2 is attached to the first strip S1 to close the receptacles 16 and to form a matrix of capsules. The second strip S2 is wound about a drum 48 rotatably supported on the machine 30. Strip S2 unwinds from drum 48 passing about roller 50 and across a splice table 52 through a gluing station 54 then a sealing station 56. The gluing station 54 is optional and in some embodiments is not provided in machine 30 or is simply bypassed if not required. This may be the case for example where strip S2 is pre-glued. In this instance the second strip S2 may be in the form of an adhesive tape of strip and according does not require the application of further adhesive.

Splicing table 52 operates to trim opposite edges of strip S2 in the event that they are oversized in comparison to strip S1. The intention is that the strips S1 and S2 have the same width and that strip S2 overlies and is aligned with sheet S1. In the event that gluing station 54 is incorporated, a thin layer of glue is provided on an upper surface of strip S1 circumscribing each respectable 16. In the gluing station 54 strip S1 and S2 are brought into contact with each other so that the adhesive on the strip S1 attaches strip S2 to strip S1 thereby sealing the receptacles 16. After the gluing station 54, or in the event that gluing station 54 is not provided, the strip S1 with overlying sheet S2 passes through sealing station 56. The sealing station 56 operates to attach and seal strip S2 to strip S1 by application of heat and/or ultrasonic welding.

Immediately downstream of station 56, there with strips S1 and S2 joined together there is now formed a matrix of sealed capsules. This matrix passes through a punch 58 which operates to cut waste material from between adjacent capsules 14 in the same row (i.e. the same belt 12) together with waste material from between adjacent rows (i.e. belts 12) of capsules. After passing through the punch 56, capsules 14 in adjacent belts may still be attached together. In order to completely separate adjacent rows (i.e. belts 12) of capsules, the matrix of capsules now passes through cutting station 60. The cutting station 60 comprises a plurality of blades to cut the matrix of capsules into eleven separate belts each of which is wound onto respective reels 62a-62k (herein after referred to in general as reels 62).

Machine 30 includes protective covers 66, 68 and 70, shown in FIG. 4, which are placed over are placed over the vacuum forming portion 38, sealing station 56 and punch 58.

The number of capsules 14 in each belt 12 and thus on each reel 62 is dependant only on the limitations of the length of strips S1 and S2 wound on drums 32 and 48, and the diameter of reels 62. In one example each belt 12 may comprise 1000 capsules 14.

Method 10 and associated machine 30 can be used to form for example, but not limited to, a belt of incendiary capsules; a belt of seed capsules; a belt of sensors such as motion, air pressure, temperature, dew point, location or vibration sensors; or a belt of animal baits.

The incendiary capsules may hold a quantity of potassium permanganate and optionally a quantity of thermite. The thermite can be provided with a liquid impervious coating or cover. These capsules can be injected with glycol and dropped from an aircraft to generate a flame when they reach the ground as described in U.S. Pat. No. 6,877,433; PCT/AU2010/000694; (the contents of both of which are incorporated herein by way of reference); U.S. Pat. No. 7,451,679 or AU 2010900875.

The capsules in a belt of seed capsules can likewise be injected but with a nutrient and/or water, separated from the belt and dropped to the ground form an aircraft or indeed a land vehicle using the same dispensing machine as the incendiary belt (e.g. as described in U.S. Pat. No. 7,451,679 or AU 2010900875). The only substantive change being the need to fill a tank in the machine with plant nutrient and/water instead of glycol.

As previously mentioned when performing the method the filling station 44 can be arranged to fill the capsules with various types of sensors such as: air pressure, temperature, dew point, location or vibration sensors; video or infra red cameras. The sensors incorporate radio transmitters and a small power source such as a battery or small photovoltaic cells to produce operating power. In such examples the material used for the fabrication of the capsules is transparent to allow transmission of light into the capsule. This opens up substantive and valuable new methods of remote sensing or distribution of materials. Several examples of such methods are described below.

In one example the capsules 16 can contain temperature sensors. Capsules 16 may then be dispensed say from an aircraft in and around a bushfire region. The sensors transmit temperature reading to a remote fire co-ordination/control centre to enables fire tracking. This can greatly assist in critical decision making in terms of deployment of resources, and coordinating evacuation in fire emergency situations.

In another example the filling station 44 is arranged to deposit animal baits in the capsules 16. These could be for example in the form of pieces of meat or sausages, or other types of food which attract a specified animal, such as wild dogs, cats rabbits etc. In such applications a relatively fast decomposing bioplastic material is used to fabricate the capsules. The capsules are deployed using a dispenser such as those described in U.S. Pat. No. 7,451,679 or AU 2010900875. When being deployed the dispenser injects a poison into the bait. Thus in this application the poison can be safely held in a container and only applied to the bait immediately prior to dispensing the corresponding capsules. This provided substantial safety advantages over current methods where for example large containers of baits containing poison are transported for a place of manufacture to a distributing vehicle such as an aircraft or motor vehicle and dispensed by hand once the vehicle has reached a desired dispensing point or area.

It is envisaged that filling the capsules with specific types of sensors also has wide military applications. For example sensors with vibration or motion detection sensors, infrared sensors, video cameras etc can be deployed from aircraft including drones or other unmanned aircraft and provide remote sensing of the location, movement and type of personnel and equipment.

A further application is in relation to tornado tracking. It is known to fly aircraft into tornadoes to provide information such as velocity, and air pressure. However in one application of embodiments of the invention capsules with location sensors may be fabricated and dispensed from aircraft to become entrained in the tornado air mass to provide real time location data enabling more accurate prediction of the tornado path.

If the method 10 and machine are used to manufacture a belt of sensors there is unlikely to be a need to inject a liquid into the capsules prior to dispensing. Nevertheless the same dispensing machine as referenced above can be use but the injector of the machine is disengaged or disabled. However it is envisaged that with some the sensor applications it may be desirable to inject a liquid which while inert in relation to the sensor may modify the decomposition speed of a corresponding capsule. In that event the inject remains in use and delivers the liquid to the capsule.

Now that embodiments of the invention have been described in detail it will be apparent to those skilled in the art that numerous modifications and variations can be made without departing from the basic inventive concepts. For example the method 10 describes strips S1 and S2 as being made from the same material. However this is not critical and different materials can be used. Also the forming station 38 can be use different techniques to vacuum forming to create the receptacle 16. All such modifications and variations together with others that would be obvious to those of ordinary skill in the art are deemed to be within the scope of the present invention the nature of which is to be determined form the above description and the appended claims.

The claims defining the invention are as follows:

1. A method of fabricating a belt of capsules comprising:
   forming a matrix of receptacles in a first strip of material;
   depositing a quantity of at least one material in each receptacle;
   attaching a second strip of material over the first strip to close the receptacles and form a matrix of capsules; and
   cutting the matrix of capsules into rows to thereby form a plurality of belts of capsules wherein each belt comprises a single row of end-to-end joined capsules.

2. The method according to claim 1 wherein forming the matrix of receptacles comprises vacuum forming the receptacles in the first strip of material.

3. The method according to claim 1 wherein attaching the second strip of material comprises providing the second strip as a roll and unwinding the roll to overlay the second strip over the first strip, wherein the second strip comprises the same material as the first strip.

4. The method according to claim 1 comprising providing the material for the first strip and the second strip as a plastics material.

5. The method according to claim 4 comprising providing the plastics material as a bioplastic material.

6. The method according to claim 1 wherein attaching the second strip over the first strip comprises one of (a) applying a layer of adhesive material to one side of either one or both of the first strip and second strip and contacting the one sides of the first strip and second strip together; and (b) ultrasonically welding together the first strip and the second strip.

7. The method according to claim 1 comprising winding the plurality of belts simultaneously onto respective rolls.

8. The method according to claim 1 wherein depositing a quantity of at least one material comprises depositing a quantity of an incendiary material.

9. The method according to claim 8 comprising depositing a quantity of thermite in each receptacle prior to attaching the second strip.

10. The method according to claim 9 comprising, prior to depositing the thermite, applying a liquid impervious coat or cover to the thermite.

11. The method according to claim 1 wherein depositing a quantity of at least one material comprises depositing at least one plant seed.

12. The method according to claim 11 comprising depositing a seed growing medium in each receptacle prior to attaching the second strip.

13. The method according to claim 1 wherein depositing a quantity of at least one material comprises depositing a sensor having a power source and transmitter.

14. The method according to claim 1 wherein depositing a quantity of at least one material comprises depositing animal bait.

15. A capsule belt manufactured in accordance with the method according to claim 1 wherein the material for the first strip and the second strip comprises a bioplastic material, and wherein the depositing of a quantity of at least one material in each receptacle consists of depositing one of the following: a plant seed; a plant seed and growing medium; an animal bait; and a sensor having a power source and transmitter.

16. A method of vegetating a tract of land comprising providing a capsule belt according to claim 15 wherein the material deposited in each capsule is a plant seed or a plant seed and growing medium, the method comprising: injecting a quantity of one or both of a plant nutrient and water into one of the capsules in the belt, separating the injected capsule from the belt and dropping the injected capsule to the tract of land.

17. The method according to claim 16 wherein dropping the injected capsule comprises dropping the injected capsule from an airborne aircraft.

18. The method according to claim 16 wherein the injecting and separating are performed in an airborne aircraft, and the dropping is performed from the aircraft while airborne.

19. A method of baiting an animal comprising providing a capsule belt according to claim 15 wherein the material deposited in each capsule is animal bait, the method comprising: injecting a quantity of a poison into one of the capsules in the belt, separating the injected capsule form the belt and dropping the injected capsule to the tract of land.

20. A method of remote sensing comprising providing a capsule belt according to claim 15 wherein the material deposited in each capsule is a sensor having a power source and transmitter, the method comprising: separating one of the capsules from the belt and dropping the separated capsule from an airborne aircraft.

* * * * *